(12) United States Patent
Yuan et al.

(10) Patent No.: US 6,792,059 B2
(45) Date of Patent: Sep. 14, 2004

(54) EARLY/ON-TIME/LATE GATE BIT SYNCHRONIZER

(75) Inventors: Rebecca W. Yuan, San Diego, CA (US); Peter R. Pawlowski, Solana Beach, CA (US)

(73) Assignee: TRW Inc., Redondo Beach, CA (US)

( * ) Notice: Subject to any disclaimer, the term of this patent is extended or adjusted under 35 U.S.C. 154(b) by 754 days.

(21) Appl. No.: 09/727,159

(22) Filed: Nov. 30, 2000

(65) Prior Publication Data

US 2002/0094046 A1 Jul. 18, 2002

(51) Int. Cl.[7] .......................... H04L 7/00; H04L 27/06; H03D 1/00
(52) U.S. Cl. .................. 375/354; 375/355; 375/340
(58) Field of Search ............................. 375/354, 355, 375/324, 340, 377; 327/141, 161

(56) References Cited

U.S. PATENT DOCUMENTS 3,800,227 A * 3/1974 Kobayashi .................. 375/333
5,566,214 A * 10/1996 Kroeger et al. ............. 375/355
5,768,323 A * 6/1998 Kroeger et al. ............. 375/355
6,415,004 B1 * 7/2002 Fujimura et al. ........... 375/324

* cited by examiner

Primary Examiner—Betsy L. Deppe

(57) ABSTRACT

A bit synchronizer for a digital receiver system accounts for loss of bit synchronization due to transmission phenomena. The bit synchronizer includes a DC level estimator for converting a sampled digital signal having a bit rate and a sampling rate into a level-adjusted signal. A delay module generates a first timing signal, a second timing signal, and a third timing signal based on the level-adjusted signal. The timing signals correspond to early, on-time, and late sampling windows. The control module generates an output signal based on the timing signals such that the transmit and receive bit timing are synchronized. In one embodiment, the control module has an absolute value stage, an integration stage, and a signal selector. The signal selector is able to select between the timing signals, adjust the symbol rate to re-center the on-time gate, and memory swap to maintain correct averaging operations.

14 Claims, 1 Drawing Sheet

EARLY/ON-TIME/LATE GATE BIT SYNCHRONIZER

This invention was made with Government support under Contract No. DAAJ09-91-C-A004 awarded by the U.S. Army. The Government has certain rights in this invention.

BACKGROUND OF THE INVENTION

1. Field of the Invention

This invention relates generally to digital receiver systems. More particularly, the invention relates to a bit synchronizer for a digital receiver system that synchronizes to the transmitter clock in terms of bit timing in order to extract correct bit information for select receiver processes.

2. Discussion of the Related Art

It is well known that communication systems are a critical part of both commercial and military applications. In fact, as semiconductor technologies advance, the demand for digital communication systems continues to grow. Digital communication systems can be conceptually divided into systems that transmit and systems that receive. In order to meet requirements for faster, more reliable communications associated with the aforementioned demand for digital communication systems, a number of modulation/demodulation schemes have evolved. Two common modulation schemes used in digital systems are amplitude shift keying (ASK) and continuous phase frequency shift keying (CPFSK). The invention is intended to be applied to demodulated baseband signals (with modulation removed).

It is important to note that some digital receiver systems provide no mechanism for subsequent signal processing to alter the timing of the receiver's sampling clock. This is when a baseband bit synchronizer comes into play. Bit synchronization is often obscured by received noise, signal fading, relative time drift, and time jitter between the received symbol sequence and the receiver sampling clock. Depending on the application, losses in bit synchronization can result in losses in critical data. It is therefore desirable to provide a bit synchronizer for a digital receiver system that is able to synchronize to the transmitter clock and extract the correct transmitted bit information.

SUMMARY OF THE INVENTION

The above and other objectives are achieved by a bit synchronization methodology for a digital receiver system in accordance with the present invention. The bit synchronizer has a DC level estimator for converting a sampled digital signal into a level-adjusted signal. A delay module generates a first timing signal, a second timing signal, and a third timing signal based on the level-adjusted signal. The first timing signal corresponds to the sum of the level-adjusted samples over a first bit or symbol interval, while the second timing signal corresponds to the sum of the level-adjusted samples over a second bit interval. Similarly, the third timing signal corresponds to the sum of the level-adjusted samples over a third bit interval. The bit synchronizer further includes a control module for generating an output signal based on the timing signals such that the polarity of the selected timing signal is used to determine the output bit value.

Further in accordance with the present invention, a control module for a bit synchronizer is provided. The control module has an absolute value stage for generating signals that are absolute values of the corresponding timing signals. An integration stage generates integrated signals, where the integrated signals represent the average energy of the corresponding timing signals over a predetermined integration length. The control module further includes a signal selector for generating an output signal by comparing the three integrated signals. The polarity of the timing signal corresponding to the largest integrated signal is used to determine the output bit value. The result is a more efficient digital receiver system that uses relative comparison instead of absolute thresholds for data selection. To maintain correct bit timing, the control module further adjusts the three timing windows by advancing or restarting the windows one sample at a time after each bit decision. The control module therefore eliminates excessive memory buffers, control logic, and time delays.

In another aspect of the invention a method for synchronizing the transmit and receive bit timing is provided. The method includes the step of converting the sampled digital signal into a level-adjusted signal. The method further includes the steps of generating a first timing signal, a second timing signal, and a third timing signal based on the level-adjusted signal. The method further provides for generating an output signal based on the timing signals such that the transmit and receive bit timing are synchronized.

BRIEF DESCRIPTION OF THE DRAWINGS

Additional objects, features and advantages of the present invention will become apparent from the following description and the appended claims when taken in connection with the accompanying drawings, wherein:

DETAILED DESCRIPTION OF THE PREFERRED EMBODIMENTS

Figure 1:
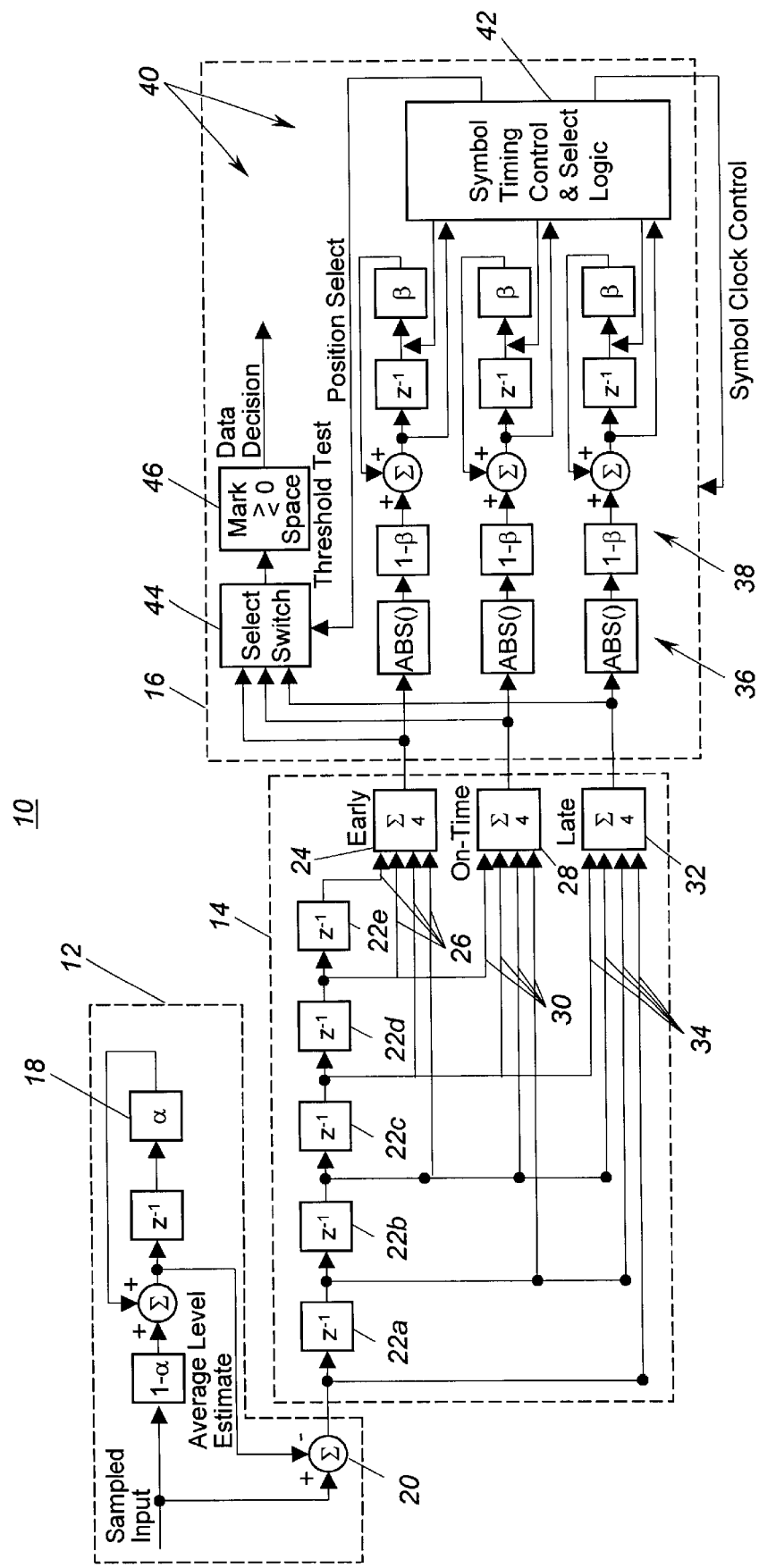
FIG. 1 is a block diagram of a bit synchronizer for a digital communication system in accordance with a preferred embodiment of the present invention.

Turning now to FIG. 1, the preferred embodiment of a bit synchronizer 10 in accordance with the present invention is shown in greater detail. While the present invention will be described with respect to input signals commonly used in military applications, it is important to note that the invention is not so limited. Thus, any digital receiver system in which bit synchronization can be obscured by received noise, signal fading, relative time drift, time jitter or any other transmission phenomena can benefit from the present invention.

Generally, the preferred bit synchronizer 10 has a DC level estimator 12, a delay module 14, and a control module 16. The DC level estimator 12 converts a sampled digital signal into a level-adjusted (or antipodal) signal. The delay module 14 generates a first timing signal, a second timing signal, and a third timing signal based on the level-adjusted signal. As will be described in greater detail below, the first timing signal (i.e., early timing signal) corresponds to the sum of the level-adjusted signal over a first bit interval. The second timing signal (i.e., on-time timing signal) corresponds to the sum of the level-adjusted signal over a second bit interval. Similarly, the third timing signal (i.e., the late signal) corresponds to the sum of the level-adjusted signal over a third bit interval. The control module 16 generates an output signal based on the timing signals such that the bit rate and the sampling rate are synchronized.

DC LEVEL ESTIMATOR

In order to create an antipodal signal from the envelope detected samples, a DC level is estimated using a single-pole low pass filter 18. The estimated DC level is then subtracted from the sampled input by summer 20. The result is a signal that varies between negative values and positive values as opposed to the positive valued baseband digital signal.

DELAY MODULE

It can be seen that the delay module 14 has serially-connected delay registers 22 for generating cumulatively delayed signals based on the level-adjusted signal and a time delay value $z^{-1}$. In the preferred embodiment, the time delay value is defined as one sample. The delay module 14 further includes an early gate 24 for generating the first timing signal based on a first subset 26 of the cumulatively delayed signals. An on-time gate 28 generates the second timing signal based on a second subset 30 of the cumulatively delayed signals. It can further be seen that a late gate 32 generates the third timing signal based on a third subset 34 of the cumulatively delayed signals. Thus, the antipodal signal resulting from the DC level estimator 12 is fed into a length-five tap delay line which feeds the early, on-time, and late gates 24, 28, 32 (or sum-and-dumps).

Since the preferred gates 24, 28, 32 are sum-and-dump modules, each timing signal represents a summation of the corresponding subset 26, 30, 34 of the cumulatively delayed signals. It can be seen that the early gate 24 sums over the four samples:

$$Z_{E,k/4} = \sum_{l=k-1}^{k+2} y_l$$

The on-time gate 28 sums over the four samples:

$$Z_{O,k/4} = \sum_{l=k}^{k+3} y_l$$

The late gate 32 sums over the four samples:

$$Z_{L,k/4} = \sum_{l=k+1}^{k+4} y_l$$

It will be noted that the three gates 24, 28, 32 dump their respective data at the symbol rate. As will be explained later, although the nominal symbol rate corresponds to four samples per symbol, this value can be changed to three samples or five samples per symbol when so commanded by the control module 16.

CONTROL MODULE

It can also be seen that the preferred control module 16 has an absolute value stage 36, an integration stage 38, and a signal selector 40. Generally, the absolute value stage 36 generates signals that are absolute values of the timing signals. The integration stage 38 generates integrated signals, where the integrated signals represent average values of the absolute valued timing signals over a predetermined integration length. The signal selector 40 generates the output signal based on the integrated signals.

Specifically, the absolute value of each gate output is given as:

$$E_n = |Z_{E,k/4}|$$

$$O_n = |Z_{OT,k/4}|$$

$$L_n = |Z_{L,k/4}|$$

The integrators in the integration stage 38 average the absolute valued gate output over an integration length adjusted by the parameter $\beta$, as:

$$\bar{E}_n = \beta \bar{E}_{n-1} + (1-\beta) E_n$$

$$\bar{O}_n = \beta \bar{O}_{n-1} + (1-\beta) O_n$$

$$\bar{L}_n = \beta \bar{L}_{n-1} + (1-\beta) L_n$$

It will further be appreciated that the signal selector 40 has a logic module 42 for generating a selection signal based on the integrated signals. A switching module 44 selects between the timing signals based on the selection signal from the logic module 42. The signal selector 40 further includes a threshold module 46 coupled to the switching module 44, where the threshold module generates the output signal based on the selected timing signal and a threshold value. The threshold value in the illustrated embodiment is zero.

Thus, a comparison is made between $\bar{E}_n$, $\bar{O}_n$, and $\bar{L}_n$. The largest of the three determines which gate output should be used for data detection. The output signal is a function of the sign of the selected gate output. That is, the output bit is one if the sign is positive or zero if the sign is negative.

It is important to note that the logic module 42 generates the selection signal in accordance with the predetermined symbol rate (nominally four). Thus, the above operation is repeated every four samples under normal conditions. It is also important to note that the logic module 42 is capable of adjusting the symbol rate based on the integrated signals. This functionality is particularly important under conditions of long drift or random timing jitter. In this case, if the largest timing signal is not $\bar{O}_n$, the logic module 42 changes the next symbol time to be three samples later if $\bar{E}_n$ is the largest. Similarly, the logic module 42 changes the next symbol time to be five samples later if $\bar{L}_n$ is the largest. The symbol is therefore re-centered to the on-time gate 28, and further timing offsets will not cause bit slippage.

In the meantime, to keep the correct averaging operation, the logic module 42 swaps integrated signals based on the selection signal. Thus, a memory swap is done between the feedback values of the three integrators ($\bar{E}_{n-1}$, $\bar{O}_{n-1}$, and $\bar{L}_{n-}$) depending on the direction of rotation with respect to the on-time gate 28. For example, if the rotation is from the early gate 24 to the on-time gate 28 (i.e., $\bar{E}_n$ is the largest), the memory swap would be:

$$tmp = \bar{L}_{n-1}$$

$$\bar{O}_{n-1} = \bar{E}_{n-1}$$

$$\bar{L}_{n-1} = \bar{O}_{n-1}$$

$$\bar{E}_{n-1} = tmp$$

The opposite swap direction would be taken if the rotation is from the late gate to the on-time gate. The adaptive bit timing control described above avoids the use of excessive memory buffer, control logic or time delay. Thus, the implementation complexity is simplified from both a hardware and software standpoint.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A bit synchronizer for a digital receiver system, the bit synchronizer comprising:
   a DC level estimator for converting a sampled digital signal having a bit rate and a sampling rate into a level-adjusted signal;
   a delay module operable to cumulatively delay the level-adjusted signal by different increments and to generate a first timing signal, a second timing signal, and a third timing signal based on the cumulatively delayed level-adjusted signals, the first timing signal corresponding to a sum of the cumulatively delayed level-adjusted signals over a first bit interval, the second timing signal corresponding to a sum of the cumulatively delayed level-adjusted signals over a second bit interval, and the third timing signal corresponding to a sum of the cumulatively delayed level-adjusted signals over a third bit interval; and
   a control module for generating an output signal based on the first, second and third timing signals such that the bit rate and the sampling rate are synchronized, wherein the control module includes:
      an absolute value stage for generating absolute values of the first, second and third timing signals;
      an integration stage for generating integrated signals, each integrated signal representing average values for a given absolute valued timing signal over a predetermined integration length;
      a logic module for generating a selection signal based on the integrated signals;
      a switching module for selecting between the first, second and third timing signals based on the selection signal; and
      a threshold module coupled to the switching module, the threshold module generating the output signal based on the selected timing signal and a threshold value.

2. The bit synchronizer of claim 1 wherein the logic module generates the selection signal in accordance with a predetermined symbol rate, the logic module further adjusting the symbol rate based on the integrated signals.

3. The bit synchronizer of claim 2 wherein the logic module reduces the symbol rate when the selected timing signal corresponds to the first timing signal.

4. The bit synchronizer of claim 2 wherein the logic module increases the symbol rate when the selected timing signal corresponds to the third timing signal.

5. The bit synchronizer of claim 2 wherein the logic module swaps integrated signals based on the selection signal.

6. The bit synchronizer of claim 1 wherein the delay module comprises:
   a plurality of serially-connected delay registers for generating a plurality of cumulatively delayed signals based on the level-adjusted signal and a time delay value;
   an early gate for generating the first timing signal based on a first subset of the cumulatively delayed signals;
   an on-time gate for generating the second timing signal based on a second subset of the cumulatively delayed signals; and
   a late gate for generating the third timing signal based on a third subset of the cumulatively delayed signals.

7. The bit synchronizer of claim 6 wherein the early gate, the on-time gate and the late gate are sum-and-dump modules such that each timing signal represents a summation of the corresponding subset of the cumulatively delayed signals.

8. The bit synchronizer of claim 7 wherein at least one of the first, second and third subsets of the cumulatively delayed signals have a subset size of four signals.

9. The bit synchronizer of claim 7 wherein the time delay value is defined as one sample period.

10. A control module for a bit synchronizer, the control module comprising:
    an absolute value stage for generating signals that are absolute values of corresponding timing signals;
    an integration stage for generating integrated signals, each of the integrated signals representing average values of a given absolute valued timing signal over a predetermined integration length; and
    a signal selector for generating an output signal based on the integrated signals; wherein the signal selector includes:
       a logic module for generating a selection signal based on the integrated signals;
       a switching module for selecting between the timing signals based on the selection signal; and
       a threshold module coupled to the switching module, the threshold module generating the output signal based on the selected timing signal and a threshold value.

11. The control module of claim 10 wherein the logic module generates the selection signal in accordance with a predetermined symbol rate, the logic module further adjusting the symbol rate based on the integrated signals.

12. The control module of claim 11 wherein the logic module reduces the symbol rate when the selected timing signal corresponds to a first timing signal, the first timing signal corresponding to energy in a level-adjusted signal over a first sampling window.

13. The control module of claim 11 wherein the logic module increases the symbol rate when the selected timing signal corresponds to a second timing signal, the second timing signal corresponding to energy in a level-adjusted signal over a second sampling window.

14. The control module of claim 10 wherein the logic module swaps integrated signals based on the selection signal.

* * * * *